H. HAGER.
GRAIN COOLER.
APPLICATION FILED JAN. 28, 1908.
921,395.
Patented May 11, 1909.
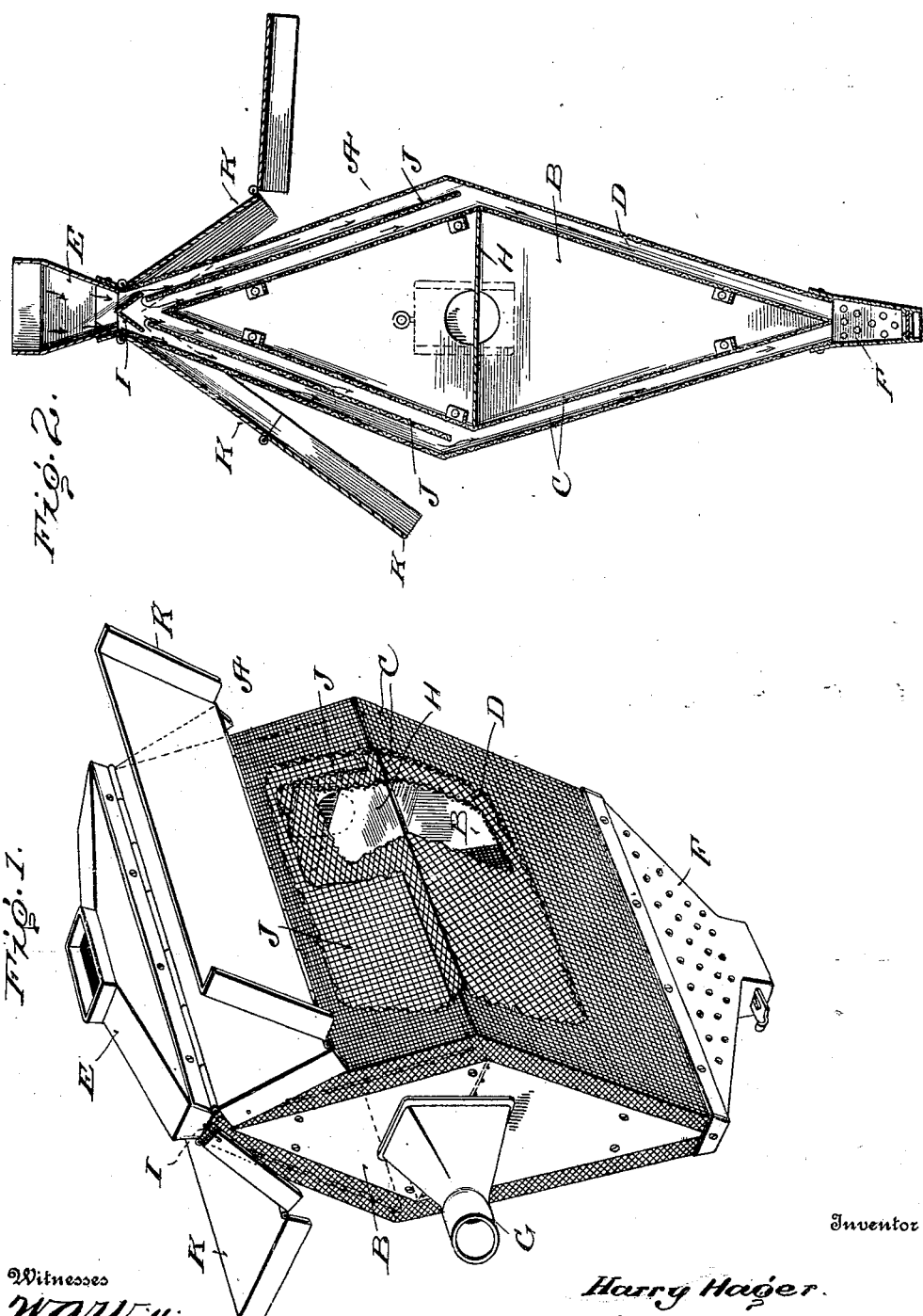
Witnesses
W. A. Williams
C. J. Ready
Inventor
Harry Hager.
By Jay D. Miller
Attorney

UNITED STATES PATENT OFFICE.

HARRY HAGER, OF CHICAGO, ILLINOIS, ASSIGNOR TO HAGER MANUFACTURING COMPANY, OF CHICAGO, ILLINOIS, A CORPORATION.

GRAIN-COOLER.

No. 921,395.      Specification of Letters Patent.      Patented May 11, 1909.

Application filed January 28, 1908. Serial No. 413,001.

*To all whom it may concern:*

Be it known that I, HARRY HAGER, a citizen of the United States, residing at Chicago, in the county of Cook and State of Illinois, have invented certain new and useful Improvements in Grain-Coolers, of which the following is a specification.

This invention relates to an apparatus for cooling grain, and especially coffee and is an improvement upon the cooler described in Letters Patent 810,140, granted to me, January 16, 1906. In the apparatus of the patent, the coffee to be cooled was delivered to a compartment or compartments with perforate walls and subjected to the action of air currents sucked in through the perforate walls. It appears, however, that the sacks or bags containing the coffee vary as to capacity and in some instances, the cooling compartments are charged to a point above the perforations and where the air does not reach, and thus a portion of the coffee becomes scorched which not infrequently means a loss of the entire batch. This is due to the fact that coffee when discharged from the roaster possesses a tremendous amount of heat and if not agitated will burn up.

It is the object of my invention to avoid this waste, and to this end the invention resides in the improvements hereinafter described and claimed.

The nature, characteristic features and scope of the invention will be more readily understood from the following description, taken in connection with the accompanying drawings, in which—

Figure 1, is a perspective view of a cooler embodying features of my invention; and Fig. 2, is a vertical sectional view of the same.

In the drawings, A, represents the cooler, which may be of the general shape of a diamond in cross section. The cooler comprises solid end walls B, and perforate side walls C. The side walls are of double thickness forming compartments or channels D, which extend from the inlet or hopper E, to the delivery spout or outlet F.

G, is an air outlet adapted for connection with a suction fan (not shown) and it will be understood that the latter sucks in currents of air through the perforate walls, as described in my patent aforementioned. For convenience the air supply may be divided as by means of a partition H, which separates the upper part of the cooler from the lower.

In practice, the coffee, or other grain to be cooled, is deflected as it falls into the hopper by a deflector plate I, into the compartments or channels D. Eventually, in the apparatus of my patent, aforestated, the grain would fill the compartments and rise to a point in the hopper beyond the path or reach of the air current. To prevent this I provide the compartments or channels with partitions or division walls J, suitably perforated so as to permit the passage of air, and which extend to near the hopper and back of the deflecting surface. The tendency is now for the grain to pass between the division wall and the outer wall of the channel D. Any excess will be forced over the top of the partition and to the rear thereof. Manifestly under the new conditions the grain cannot get beyond the path of the air blast.

K, are suitable shutters to prevent wastage of air pressure when the channels are not occupied or are comparatively empty.

Having described the nature and objects of the invention, I claim:

A cooler comprising an air chamber having an inlet and an outlet and bounded by perforate compartments or passages for the coffee, perforate partitions dividing said compartments, a hopper, and a deflector plate intermediate the hopper and compartments and tending to direct the coffee between the outer wall of the compartment and the partition plate, the arrangement being such that in the event of an overload, the excess will be directed back of the partition, substantially as specified.

In testimony whereof I have hereunto signed my name in the presence of two subscribing witnesses.

HARRY HAGER.

Witnesses:
  ALBERT G. HUBBARD,
  JAY D. MILLER.